US012519258B2

(12) United States Patent
Wei et al.

(10) Patent No.: US 12,519,258 B2
(45) Date of Patent: Jan. 6, 2026

(54) ELECTRICAL CONNECTOR

(71) Applicant: EZCONN CORPORATION, New Taipei (TW)

(72) Inventors: Kai-Chih Wei, New Taipei (TW); Shu-Mei Hsu, New Taipei (TW)

(73) Assignee: EZCONN CORPORATION, New Taipei (TW)

( * ) Notice: Subject to any disclaimer, the term of this patent is extended or adjusted under 35 U.S.C. 154(b) by 344 days.

(21) Appl. No.: 18/380,562

(22) Filed: Oct. 16, 2023

(65) Prior Publication Data

US 2025/0055211 A1 Feb. 13, 2025

(30) Foreign Application Priority Data

Aug. 9, 2023 (TW) ................................ 112208390

(51) Int. Cl.

| | |
|---|---|
| ***H01R 24/50*** | (2011.01) |
| ***H01R 12/71*** | (2011.01) |
| ***H01R 13/24*** | (2006.01) |
| ***H01R 13/41*** | (2006.01) |
| ***H01R 13/512*** | (2006.01) |
| ***H01R 13/621*** | (2006.01) |
| ***H01R 13/627*** | (2006.01) |
| ***H01R 24/62*** | (2011.01) |

(52) U.S. Cl.
CPC ....... *H01R 12/716* (2013.01); *H01R 13/2421* (2013.01); *H01R 13/41* (2013.01); *H01R 13/512* (2013.01); *H01R 13/621* (2013.01); *H01R 13/6273* (2013.01); *H01R 24/62* (2013.01)

(58) Field of Classification Search
CPC ............... G01R 1/0416; H01R 12/716; H01R 13/2421; H01R 13/41; H01R 13/512; H01R 13/621; H01R 13/6273; H01R 24/50; H01R 24/62; H01R 43/205; H01R 12/70; H01R 12/7011; H01R 12/7047; H01R 12/72
USPC ............................................................ 439/63
See application file for complete search history.

(56) References Cited

U.S. PATENT DOCUMENTS 6,948,977 B1 * 9/2005 Behrent ............... H01R 13/659 439/607.01
7,500,855 B2 * 3/2009 Kari ....................... H01R 24/50 439/63

(Continued)

FOREIGN PATENT DOCUMENTS

TW M634608 U 11/2022

*Primary Examiner* — Abdullah A Riyami
*Assistant Examiner* — Thang H Nguyen
(74) *Attorney, Agent, or Firm* — Maschoff Brennan

(57) ABSTRACT

An electrical connector includes a seat body, a signal joint, a clamp component, a fastener and a protective cover. The seat body includes a main portion and a mount portion. The signal joint is fixed to the main portion and has a terminal. The clamp component is movably disposed on the main portion. The terminal is located at one side of the mount portion located closer to the clamp component. The fastener is disposed on the mount portion. The protective cover, has a recess. The protective cover is removably sleeved on the mount portion and the fastener, the protective cover is partially located between the mount portion and the clamp component, the terminal is located in the recess, an installation slot is formed between the protective cover and the clamp component for the circuit board to be inserted into for aligning the circuit board with the terminal.

11 Claims, 8 Drawing Sheets

(56) References Cited

U.S. PATENT DOCUMENTS

| | | | | |
|---|---|---|---|---|
| 7,980,893 | B2 * | 7/2011 | Sato | H01R 24/50<br>439/63 |
| 12,381,342 | B2 * | 8/2025 | Hsu | H01R 12/721 |
| 2006/0234562 | A1 * | 10/2006 | Lin | H01R 24/58<br>439/668 |
| 2007/0054510 | A1 * | 3/2007 | Price | H01R 9/0515<br>439/63 |
| 2008/0102654 | A1 * | 5/2008 | Kari | H05K 1/0243<br>439/63 |
| 2008/0139009 | A1 * | 6/2008 | Suzuki | G01R 1/0416<br>439/63 |
| 2008/0176439 | A1 * | 7/2008 | Chen | H05K 1/182<br>439/345 |
| 2009/0011619 | A1 * | 1/2009 | Akama | H01R 24/50<br>439/63 |
| 2011/0021042 | A1 * | 1/2011 | Weidner | H01R 24/50<br>439/63 |
| 2021/0273385 | A1 * | 9/2021 | Kim | H05K 1/117 |

* cited by examiner

ELECTRICAL CONNECTOR

CROSS-REFERENCE TO RELATED APPLICATIONS

This non-provisional application claims priority under 35 U.S.C. § 119 (a) on Patent Application No(s). 112208390 filed in Taiwan, R.O.C. on Aug. 9, 2023, the entire contents of which are hereby incorporated by reference.

TECHNICAL FIELD

The disclosure relates to an electrical connector, more particularly to an electrical connector provided with a clamp component and a fastener.

BACKGROUND

Currently, there is a type of coaxial electrical connector available on the market for a test circuit board to be laterally installed thereon. The test circuit board is used to test a signal transmitted from a coaxial cable connected to the coaxial electrical connector.

However, during the installation of the test circuit board onto the coaxial electrical connector, the test circuit board may easily hit a mating terminal of the coaxial electrical connector, which may damage the mating terminal of the coaxial electrical connector. Therefore, how to solve this issue is one of the topics in this field.

SUMMARY

The disclosure provides an electrical connector which is capable of preventing the test circuit board from hitting and damaging the mating terminal of the coaxial electrical connector during the installation of the test circuit board onto the coaxial electrical connector.

One embodiment of the disclosure provides an electrical connector. The electrical connector is configured to be assembled with a circuit board. The electrical connector includes a seat body, a signal joint, a clamp component, at least one fastener and a protective cover. The seat body includes a main portion and at least one mount portion connected to each other. The signal joint is fixed to the main portion and has a terminal. The clamp component is movably disposed on the main portion for being selectively located closer to or farther away from the mount portion. The terminal of the signal joint is located at one side of the mount portion located closer to the clamp component. The fastener is disposed on the mount portion and selectively fastened to the clamp component. The protective cover, has a recess. The protective cover is removably sleeved on the mount portion and the fastener, the protective cover is partially located between the mount portion and the clamp component, the terminal is located in the recess, an installation slot is formed between the protective cover and the clamp component, and the installation slot is configured for the circuit board to be inserted into for aligning the circuit board with the terminal.

According to the electrical connector as discussed in the above embodiments, the protective cover is removably sleeved on the mount portions and the fasteners, the protective cover is partially located between the mount portions and the clamp component, the terminal is located in the recess, and the installation slot is formed between the protective cover and the clamp component for the insertion of the circuit board, such that during the process of the circuit board inserted into the installation slot to be aligned with the terminal, the protective cover can separate the circuit board from the terminal for preventing the circuit board from hitting the terminal, thereby ensuring the terminal not to be damaged by the circuit board.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
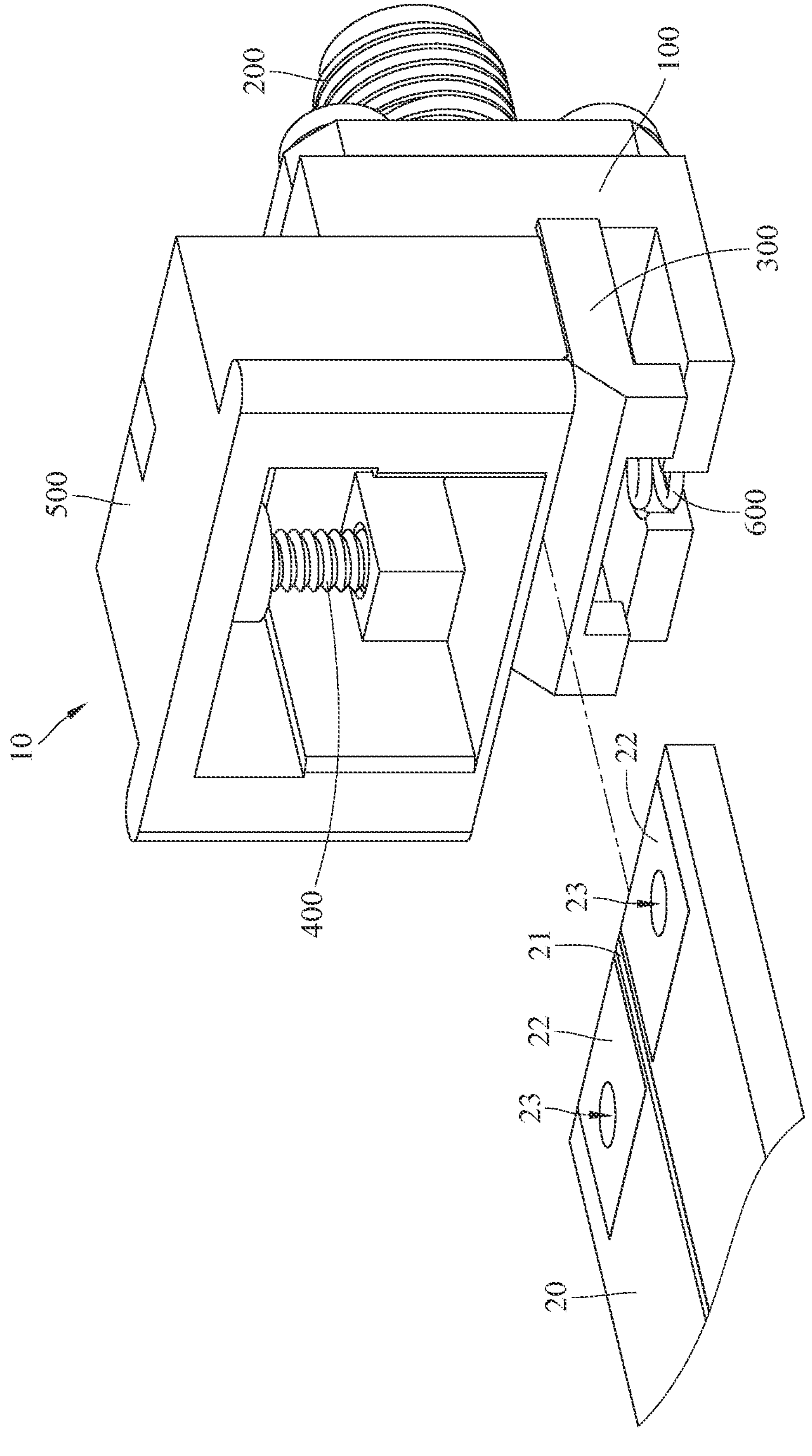
FIG. 1 is a perspective view of an electrical connector and a circuit board according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
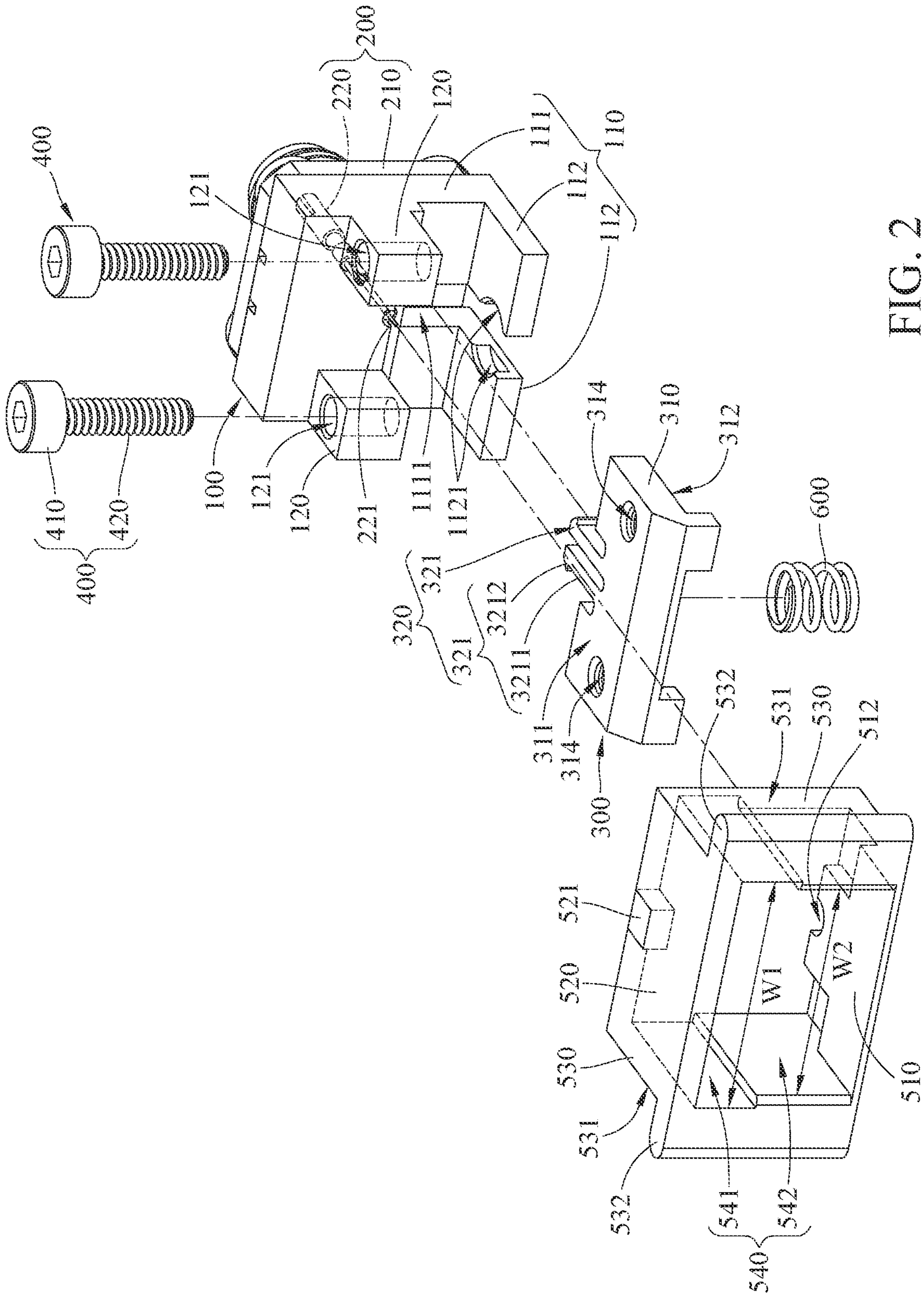
FIGS. 2 and 3 are respectively different exploded views of the electrical connector in FIG. 1.
Figure 3:
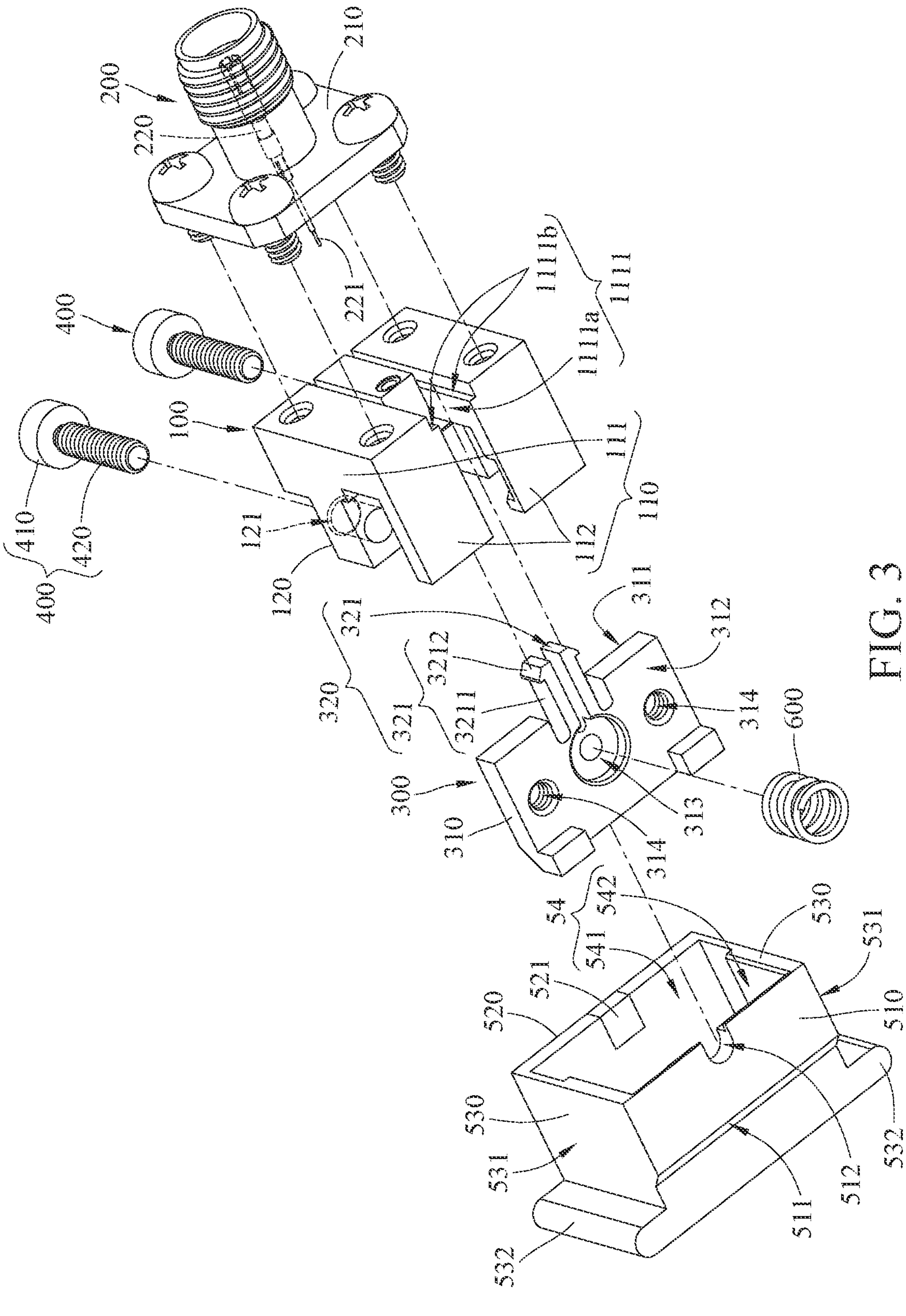
Figure 4:
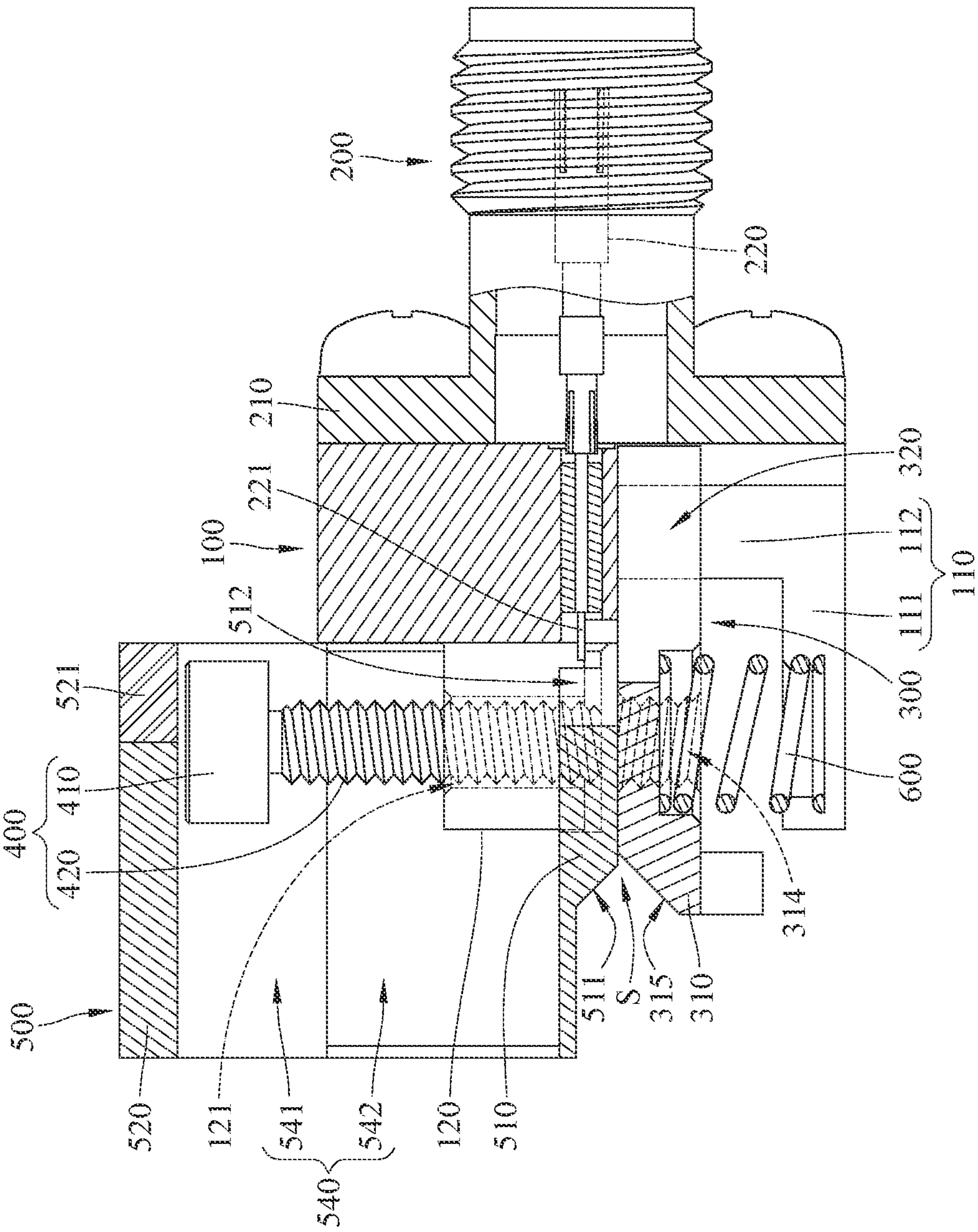
FIG. 4 is a cross-sectional view of the electric connector in FIG. 1.

Referring to FIGS. 1 to 4, FIG. 1 is a perspective view of an electrical connector 10 and a circuit board 20 according to one embodiment of the disclosure, FIGS. 2 and 3 are respectively different exploded views of the electrical connector 10 in FIG. 1, and FIG. 4 is a cross-sectional view of the electric connector 10 in FIG. 1.

In this embodiment, the electrical connector 10 is configured for an installation of the circuit board 20, and the circuit board 20 can be installed on the electrical connector 10 in a lateral insertion manner. The circuit board 20 has a feeding terminal 21, two ground terminals 22 and two positioning holes 23. The feeding terminal 21 is located between the two ground terminals 22, and the two positioning holes 23 are respectively located at the two ground terminals 22. The electrical connector 10 includes a seat body 100, a signal joint 200, a clamp component 300, two fasteners 400 and a protective cover 500.

The seat body 100 includes a main portion 110 and two mount portions 120, and the main portion 110 includes a base part 111 and two support parts 112. The two support parts 112 and the two mount portions 120 are connected to a same side of the base part 111. Each of the two mount portions 120 has a through hole 121 without a threaded structure.

The signal joint 200 is, for example, a SMA joint, a 2.92 joint or a 2.4 joint. The signal joint 200 includes a coupling seat 210 and a terminal 220. The terminal 220 is partially located in the coupling seat 210 and extends and penetrates through the coupling seat 210 and the base part 111 of the seat body 100, and the terminal 220 has a contact portion 221 exposed from the base part 111 of the seat body 100. The contact portion 221 of the terminal 220 are located at sides of the two mount portions 120 located closer to the two support parts 112. The coupling seat 210 is configured to be assembled with a coaxial cable (not shown) for electrically connecting the terminal 220 with the coaxial cable.

In this embodiment, the base part 111 has a sliding channel 1111, and the clamp component 300 includes a plate portion 310 and an assembling portion 320 connected to each other. The assembling portion 320 of the clamp component 300 is slidably mounted into the sliding channel 1111, and the plate portion 310 of the clamp component 300 is located between the support parts 112 and the mount portions 120 of the seat body 100. The plate portion 310 of the clamp component 300 can be moved to be located closer to or farther away from the mount portions 120 relatively. For example, the sliding channel 1111 has an insertion portion 1111*a* and two fastening portions 1111*b*, and the two fastening portions 1111*b* are respectively recessed from two opposite inner surfaces of the insertion portion 1111*a*. The assembling portion 320 of the clamp component 300 includes two hook structures 321, and each of the hook structures 321 includes an elastic arm 3211 and an engagement block 3212. The elastic arms 3211 of the hook structures 321 protrude from a same side of the plate portion 310 and are spaced apart from each other, and the engagement blocks 3212 are respectively connected to ends of the elastic arms 3211 located farther away from the plate portion 310. The elastic arms 3211 are located in the insertion portion 1111*a* of the sliding channel 1111, and the engagement blocks 3212 are respectively located in the fastening portions 1111*b*. As a result, the hook structures 321 enable the clamp component 300 to be movable relative to the base part 111 of the main portion 110 of the seat body 100 and to be unseparated from the base part 111.

Note that the assembling structures between the clamp component 300 and the base part 111 of the seat body 100 are not restricted in the disclosure and may be modified to other suitable structures as long as the clamp component is movable towards or away from the mount portions relative to the base part of the seat body.

In this embodiment, the plate portion 310 of the clamp component 300 has an upper surface 311, a lower surface 312, a positioning recess 313 and two threaded holes 314. The upper surface 311 and the lower surface 312 are located opposite to each other, and the upper surface 311 faces the mount portions 120 of the seat body 100, and the lower surface 312 faces the support parts 112 of the seat body 100. The positioning recess 313 is recessed from the lower surface 312, and the threaded holes 314 are recessed from the upper surface 311. The threaded holes 314 are provided with threaded structures respectively. Each of the support parts 112 of the seat body 100 has a positioning recess 1121.

In this embodiment, the electrical connector 10 may further include an elastic component 600. The elastic component 600 is, for example, a compression spring. The elastic component 600 is located between the clamp component 300 and the support parts 112 of the seat body 100, and two opposite ends of the elastic component 600 are respectively located in the positioning recess 313 of the plate portion 310 of the clamp component 300 and the positioning recesses 1121 of the support parts 112 so as to be positioned. The elastic component 600 is configured to force the clamp component 300 to move towards the mount portions 120 of the seat body 100.

The fasteners 400 are, for example, bolts. Each of the fasteners 400 includes a head portion 410 and a body portion 420 connected to each other. In each of the fasteners 400, an outer diameter of the head portion 410 is greater than an outer diameter of the body portion 420, and the body portion 420 has a threaded structure. The body portions 420 of the fasteners 400 are respectively disposed through the through holes 121 of the mount portions 120 of the seat body 100, and the head portions 410 of the fasteners 400 are located at sides of the mount portions 120 located farther away from the plate portion 310 of the clamp component 300. The body portions 420 of the fasteners 400 are configured to be screwed into the threaded holes 314 of the plate portion 310 of the clamp component 300.

The protective cover 500 includes a first positioning portion 510, a second positioning portion 520 and two connection portions 530. Two opposite sides of the first positioning portion 510 are respectively connected to two opposite sides of the second positioning portion 520 via the two connection portions 530. The first positioning portion 510, the connection portions 530 and the second positioning portion 520 together form an accommodation space 540. The protective cover 500 is removably sleeved on the mount portions 120 of the seat body 100 and the fasteners 400, such that the mount portions 120 of the seat body 100 and the fasteners 400 are located in the accommodation space 540 and are located between the first positioning portion 510 and the second positioning portion 520, and the first positioning portion 510 is located between the mount portions 120 and the plate portion 310 of the clamp component 300.

In this embodiment, the accommodation space 540 of the protective cover 500 has a wide portion 541 and a narrow portion 542 connected to each other. The wide portion 541 is located farther away from the first positioning portion 510 than the narrow portion 542, and a width W1 of the wide portion 541 is greater than a width W2 of the narrow portion 542. The head portions 410 of the fasteners 400 are located in the wide portion 541 of the accommodation space 540, and the mount portions 120 of the seat body 100 are located in the narrow portion 542 of the accommodation space 540.

In this embodiment, the wide portion 541 of the accommodation space 540 is used to accommodate the wider head portions 410 of the fasteners 400, but the disclosure is not limited thereto; in some other embodiments, the accommodation space may not have the wide portion and the narrow portion, and the accommodation space may have a uniform width which enables to accommodate the head portions of the fasteners.

In this embodiment, an installation slot S is formed between the first positioning portion 510 of the protective cover 500 and the plate portion 310 of the clamp component 300, and the installation slot S is configured for the circuit board 20 to be inserted into. Moreover, the first positioning portion 510 of the protective cover 500 has an inclined guide surface 511, and the plate portion 310 of the clamp component 300 has an inclined guide surface 315. The inclined guide surface 511 of the first positioning portion 510 of the protective cover 500 and the inclined guide surface 315 of the plate portion 310 of the clamp component 300 are both located at an inlet of the installation slot S.

Furthermore, the first positioning portion 510 has a recess 512. The recess 512 is located between the narrow portion 542 of the accommodation space 540 and the installation slot S, and the contact portion 221 of the terminal 220 is located in the recess 512. The second positioning portion 520 has a light permeable structure 521, and the light permeable structure 521 is, for example, a magnifier structure. Naked eyes can see the contact portion 221 of the terminal 220 in the recess 512 through the light permeable structure 521, and can see the position in the installation slot S where the contact portion 221 of the terminal 220 corresponds through the recess 512.

In this embodiment, each of the connection portions 530 of the protective cover 500 has a side surface 531 and a grip portion 532. The side surfaces 531 of the connection portions 530 face away from the accommodation space 540, and the grip portions 532 are respectively located at the side surface 531. For example, the grip portions 532 are, for example, tab structures and respectively protrude from side surfaces 531.

Then, the following paragraphs will introduce the installation of the circuit board 20 onto the electrical connector 10. Referring to FIGS. 5 to 8, FIGS. 5 to 8 are cross-sectional views of the electrical connector 10 in FIG. 1 showing the installation of the circuit board 20 onto the electrical connector 10.

Figure 5:
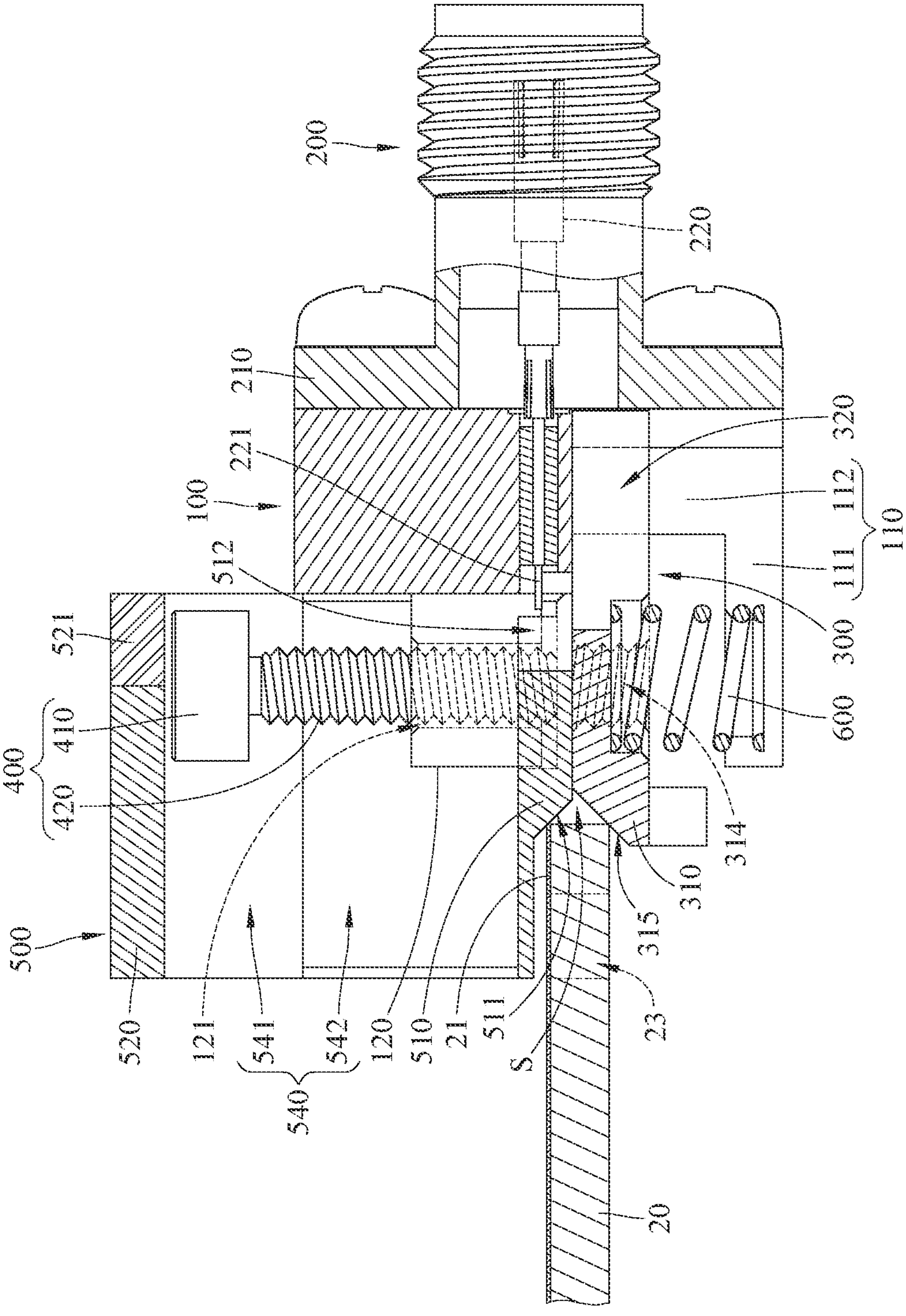
FIGS. 5 to 8 are cross-sectional views of the electrical connector in FIG. 1 showing the installation of the circuit board onto the electrical connector.
Figure 6:
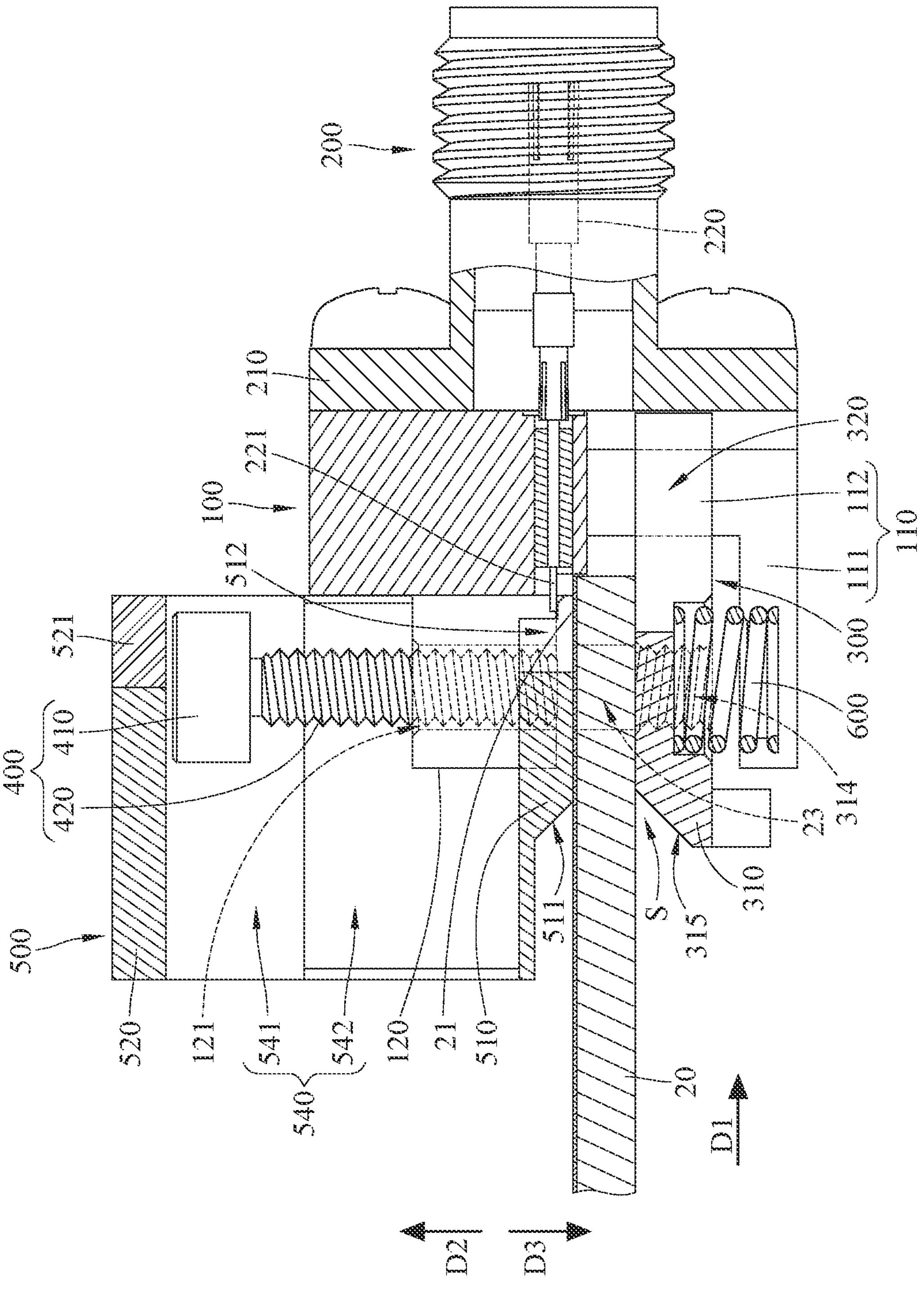

Firstly, as shown in FIG. 5, the circuit board 20 is in contact with the inclined guide surface 511 of the first positioning portion 510 of the protective cover 500 and the inclined guide surface 315 of the plate portion 310 of the clamp component 300, such that the circuit board 20 is placed at the inlet of the installation slot S. Then, as shown in FIG. 6, the circuit board 20 is pushed towards the base part 111 of the seat body 100 (e.g., along a direction D1), such that the circuit board 20 is further inserted into the installation slot S. During the movement of the circuit board 20 towards the base part 111 of the seat body 100, the moving circuit board 20 forces the protective cover 500 and the clamp component 300 to move upwards or downwards respectively (e.g., along two directions D2 and D3), and thus the plate portion 310 of the clamp component 300 compresses the elastic component 600.

Then, as shown in FIGS. 1 and 6, after the circuit board 20 is in contact with the base part 111 of the seat body 100, the circuit board 20 is unable to be moved further. At this moment, an alignment situation between the contact portion 221 of the terminal 220 in the recess 512 of the first positioning portion 510 and the feeding terminal 21 of the circuit board 20 can be seen through the light permeable structure 521 of the second positioning portion 520, and then the contact portion 221 of the terminal 220 is accurately aligned with the feeding terminal 21 of the circuit board 20.

Figure 7:
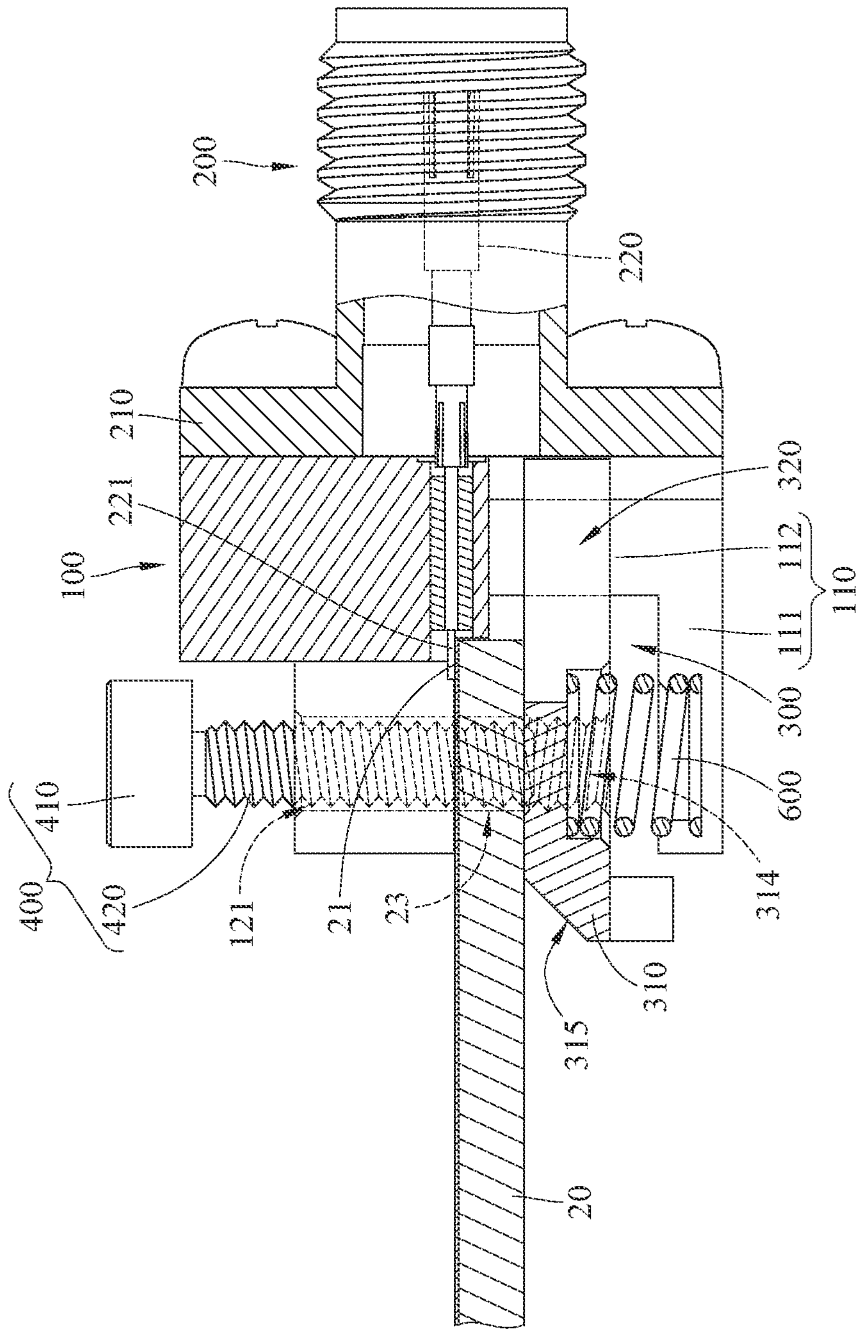

Then, as shown in FIGS. 1 and 7, the protective cover 500 is entirely removed from the seat body 100 so as to yield a space allowing the circuit board 20 and the clamp component 300 to be moved towards the mount portions 120 of the seat body 100. At this moment, the elastic component 600 forces the clamp component 300 to push the circuit board 20 towards the mount portions 120. As a result, the feeding terminal 21 of the circuit board 20 is accurately in contact with the contact portion 221 of the terminal 220, and the clamp component 300 and the mount portions 120 together clamp the circuit board 20 so as to preliminarily position the circuit board 20 for preventing the feeding terminal 21 of the circuit board 20 from being offset from the contact portion 221 of the terminal 220. In addition, when the protective cover 500 is removed from the seat body 100, the fasteners 400 are no longer constrained by the protective cover 500, allowing the fasteners 400 to fall and pass through the positioning holes 23 of the circuit board 20 respectively.

Figure 8:
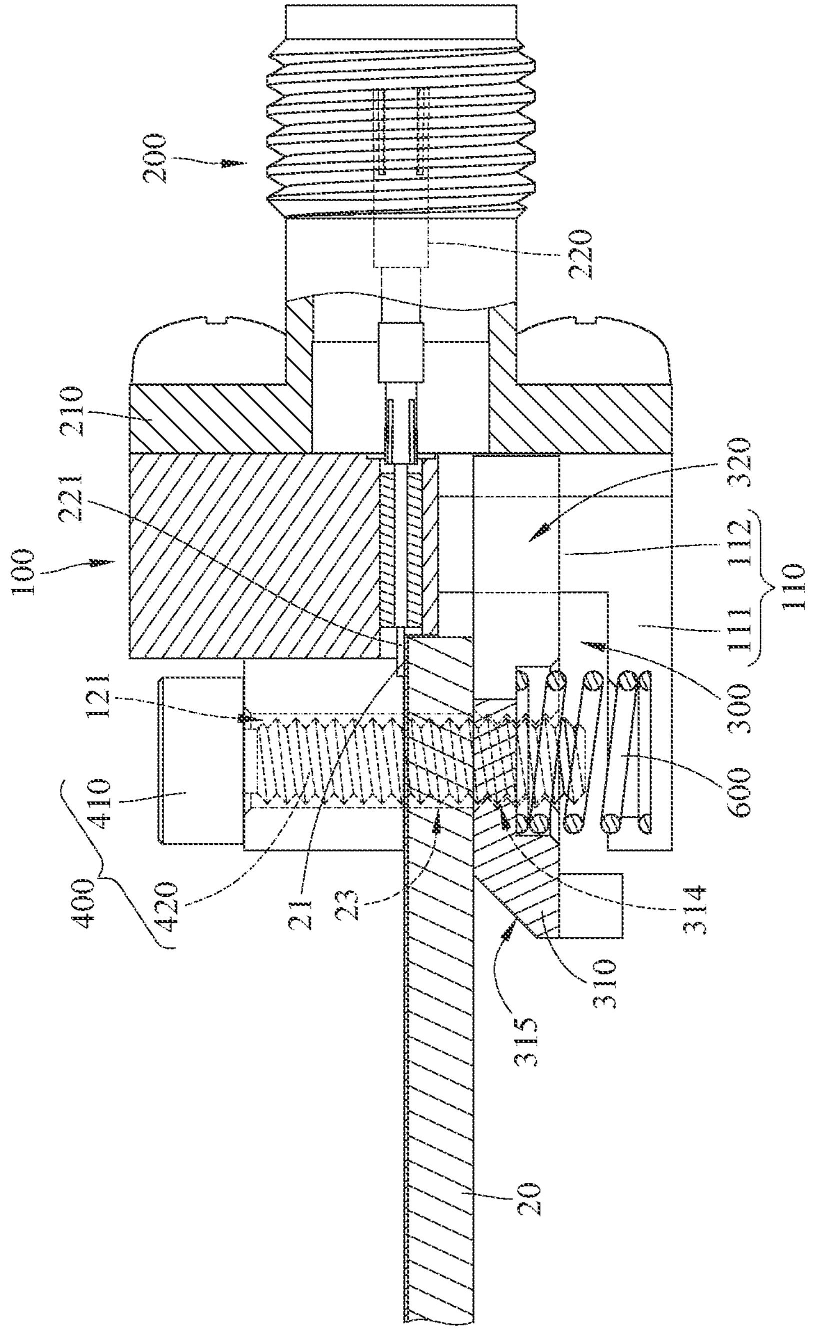

Then, as shown in FIG. 8, the fasteners 400 are rotated so as to screw the body portions 420 of the fasteners 400 into the threaded holes 314 of the plate portion 310 of the clamp component 300 respectively and move the head portions 410 of the fasteners 400 towards sides of the mount portions 120 located farther away from the plate portion 310 of the clamp component 300. When the head portions 410 of the fasteners 400 are in contact with the sides of the mount portions 120 located farther away from the plate portion 310 of the clamp component 300, continuous rotation of the fasteners 400 forces the plate portion 310 of the clamp component 300 to tightly press against the circuit board 20 upwards for strengthening a clamping force exerted on the circuit board 20 by the clamp component 300 and the mount portions 120. As a result, the circuit board 20 is firmly fixed on the seat body 100 of the electrical connector 10, and thus the installation of the circuit board 20 onto the electrical connector 10 is finished.

In this embodiment, the protective cover 500 is removably sleeved on the mount portions 120 and the fasteners 400, the protective cover 500 is partially located between the mount portions 120 and the clamp component 300, the terminal 220 is located in the recess 512, and the installation slot S is formed between the protective cover 500 and the clamp component 300 for the insertion of the circuit board 20, such that during the process of the circuit board 20 inserted into the installation slot S to be aligned with the terminal 220, the protective cover 500 can separate the circuit board 20 from the terminal 220 for preventing the circuit board 20 from hitting the terminal 220, thereby ensuring the terminal 220 not to be damaged by the circuit board 20.

Moreover, the light permeable structure 521 of the second positioning portion 520 of the protective cover 500 can help a user to observe the alignment situation of the feeding terminal 21 of the circuit board 20 and the contact portion 221 of the terminal 220 for facilitating accurate alignment between them. Furthermore, the light permeable structure 521 of the second positioning portion 520 is the magnifier structure, which further facilitates the accurate alignment between the feeding terminal 21 of the circuit board 20 and the contact portion 221 of the terminal 220.

Note that the light permeable structure 521 is not restricted to being merely located at the second positioning portion 520 of the protective cover 500; in some other embodiments, another portion of the protective cover (e.g., one of the connection portions 530) may also have the light permeable structure. Moreover, the light permeable structure 521 of the protective cover 500 is not restricted to being the magnifier structure and may be modified to be merely permeable for light but without magnifying capability in some other embodiments. In one embodiment, the entire protective cover may be made of light permeable material. Alternatively, in another one embodiment, the protective cover may not have the light permeable structure, and the alignment between the feeding terminal of the circuit board and the contact portion of the terminal may be performed after the protective cover is removed.

In this embodiment, the fasteners 400 are located in the protective cover 500 and constrained by the first positioning portion 510 and the second positioning portion 520, such that the fasteners 400 can be properly maintained on the mount portions 120 of the seat body 100 in advance before the electrical connector 10 is assembled with the circuit board 20 for preventing the fasteners 400 from becoming lost.

In addition, before the electrical connector 10 is assembled with the circuit board 20, not only the fasteners 400 but also the clamp component 300 and the elastic component 600 in the electrical connector 10 are integrated onto the seat body 100. Therefore, during the installation of the circuit board 20 onto the seat body 100, the aforementioned components do not need to be mounted individually onto the seat body 100, thereby improving the installation efficiency of the circuit board 20.

Note that the elastic component 600 is an optional component and may be omitted in some other embodiments. In such a case, after the protective cover is removed, the fasteners may be screwed into the threaded holes of the clamp component while keeping contacting the sides of the mount portions located farther away from the clamp component, such that the fasteners can move the clamp component towards the circuit board via threaded structures for allowing the clamp component and the mount portions to clamp the circuit board together.

In this embodiment, the grip portions 532 of the protective cover 500 can facilitate fingers of the user to grip and move the protective cover 500 for removing the protective cover 500. Note that the grip portions of the protective cover are optional structures; in some other embodiments, the protective cover may not have the grip portions but have structures for increasing the friction between the fingers and the protective cover, such as protrusion-recess structures. Alternatively, in another embodiment, the protective cover may have both the grip portions and the protrusion-recess structures.

In this embodiment, the fasteners 400 are sequentially disposed through the through holes 121 of the mount portions 120 and the positioning holes 23 of the circuit board 20 and then are screwed into the threaded holes 314 of the clamp component 300 for fixing the circuit board 20 in position. Compared to a conventional case that the fasteners are sequentially screwed into threaded holes of the support parts and disposed through the clamp component and the positioning holes of the circuit board for fixing the circuit board in position, this embodiment can prevent the support parts from being deformed and damaged after the fasteners are screwed into the support parts.

Note that the quantities of the mount portions 120 of the seat body 100, the threaded holes 314 of the clamp component 300 and the fasteners 400 are not restricted and each may be modified to be one in some other embodiments.

According to the electrical connector as discussed in the above embodiments, the protective cover is removably sleeved on the mount portions and the fasteners, the protective cover is partially located between the mount portions and the clamp component, the terminal is located in the recess, and the installation slot is formed between the protective cover and the clamp component for the insertion of the circuit board, such that during the process of the circuit board inserted into the installation slot to be aligned with the terminal, the protective cover can separate the circuit board from the terminal for preventing the circuit board from hitting the terminal, thereby ensuring the terminal not to be damaged by the circuit board.

Moreover, the light permeable structure of the second positioning portion of the protective cover can help a user to observe the alignment situation of the feeding terminal of the circuit board and the contact portion of the terminal for facilitating accurate alignment between them. Furthermore, the light permeable structure of the second positioning portion is the magnifier structure, which further facilitates the accurate alignment between the feeding terminal of the circuit board and the contact portion of the terminal.

In this embodiment, the fasteners are located in the protective cover and constrained by the first positioning portion and the second positioning portion, such that the fasteners can be properly maintained on the mount portions of the seat body in advance before the electrical connector is assembled with the circuit board for preventing the fasteners from becoming lost.

In addition, before the electrical connector is assembled with the circuit board, not only the fasteners but also the clamp component and the elastic component in the electrical connector are integrated onto the seat body. Therefore, during the installation of the circuit board onto the seat body, the aforementioned components do not need to be mounted individually onto the seat body, thereby improving the installation efficiency of the circuit board.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An electrical connector, configured to be assembled with a circuit board, the electrical connector comprising:

- a seat body, comprising a main portion and at least one mount portion connected to each other;
- a signal joint, fixed to the main portion and having a terminal;
- a clamp component, movably disposed on the main portion for being selectively located closer to or farther away from the at least one mount portion, wherein the terminal of the signal joint is located at one side of the at least one mount portion located closer to the clamp component;
- at least one fastener, disposed on the at least one mount portion and selectively fastened to the clamp component; and
- a protective cover, having a recess, wherein the protective cover is removably sleeved on the at least one mount portion and the at least one fastener, the protective cover is partially located between the at least one mount portion and the clamp component, the terminal is located in the recess, an installation slot is formed between the protective cover and the clamp component, and the installation slot is configured for the circuit board to be inserted into for aligning the circuit board with the terminal.

2. The electrical connector according to claim 1, wherein the protective cover comprises a first positioning portion, a second positioning portion and two connection portions, two opposite sides of the first positioning portion are respectively connected to two opposite sides of the second positioning portion via the two connection portions, the recess is located at the first positioning portion, the at least one mount portion and the at least one fastener are located between the first positioning portion and the second positioning portion, the first positioning portion is located between the at least one mount portion and the clamp component, and the installation slot is formed between the first positioning portion and the clamp component.

3. The electrical connector according to claim 2, wherein the second positioning portion has a light permeable structure.

4. The electrical connector according to claim 3, wherein the light permeable structure is a magnifier structure.

5. The electrical connector according to claim 1, further comprising an elastic component, wherein the main portion comprises a base part and a support part, the at least one mount portion and the support part are connected to a same side of the base part, the clamp component is located between the support part and the at least one mount portion, and the elastic component is located between and in contact with the clamp component and the support part.

6. The electrical connector according to claim 1, wherein the protective cover has an accommodation space, a side surface and a grip portion, the at least one mount portion and the at least one fastener are located in the accommodation space, the side surface faces away from the accommodation space, and the grip portion is located at the side surface.

7. The electrical connector according to claim 1, wherein the protective cover has an accommodation space, the accommodation space has a wide portion and a narrow portion connected to each other, a width of the wide portion is greater than a width of the narrow portion, the at least one mount portion is located in the narrow portion, and the at least one fastener is partially located in the wide portion.

8. The electrical connector according to claim 1, wherein each of the clamp component and the protective cover has an inclined guide surface, and the two inclined guide surfaces are located at an inlet of the installation slot.

9. The electrical connector according to claim 1, wherein the main portion has a sliding channel, the clamp component includes a plate portion and an assembling portion connected to each other, the assembling portion is slidably mounted into the sliding channel, the protective cover is partially located between the at least one mount portion and the plate portion of the clamp component, and the installation slot is formed between the protective cover and the plate portion of the clamp component.

10. The electrical connector according to claim 9, wherein the sliding channel has an insertion portion and two fastening portions, the two fastening portions are respectively recessed from two opposite inner surfaces of the insertion portion, the assembling portion of the clamp component comprises two hook structures, each of the two hook structures comprises an elastic arm and an engagement block, the two elastic arms of the two hook structures protrude from a same side of the plate portion and are spaced apart from each other, the two engagement blocks are respectively connected to ends of the two elastic arms located farther away from the plate portion, the two elastic arms are located in the insertion portion of the sliding channel, and the two engagement blocks are respectively located in the two fastening portions.

11. The electrical connector according to claim 1, wherein the at least one mount portion has a through hole without a threaded structure, the clamp component has at least one threaded hole, the at least one fastener is, for example, a bolt, and the at least one fastener is disposed through the through hole of the at least one mount portion and is selectively screwed into the at least one threaded hole of the clamp component.

* * * * *